3,202,718
SYNTHESIS OF BIS(TRIFLUOROMETHYL) PEROXIDE

Ellsworth K. Ellingboe and Alan L. McClelland, Wilmington, Del., assignors to E. I. du Pont de Nemours and Company, Wilmington, Del., a corporation of Delaware
No Drawing. Filed June 20, 1960, Ser. No. 37,080
4 Claims. (Cl. 260—610)

This invention relates to, and has as its principal object provision of, a new process for preparing bis(trifluoromethyl) peroxide.

Bis(trifluoromethyl) peroxide, $CF_3OOCF_3$, is a little-known fluorocarbon derivative which has recently been found useful as an initiator for the polymerization of ethylenically unsaturated compounds (cf. U.S. Patent 3,069,404). It has qualities which are unusual for organic peroxides in that it is normally a gas, it has good thermal stability, and it is nonexplosive. As a polymerization initiator it has additional qualities which are unique and useful in that it initiates polymerizations at high temperature, and its use results in polymers of good stability because undesirably reactive end groups are not introduced. A simple and economical method of obtaining bis(trifluoromethyl) peroxide has therefore become important.

In the past bis(trifluoromethyl) peroxide has been obtained in small amounts by electrolytic fluorination of solutions containing trifluoroacetate ions [Swarts, Soc. Chim. Belg., 42, 102 (1933)], and in somewhat more satisfactory yields by methods recently described by Porter and Cady in J. Am. Chem. Soc., 79, 5628 (1957). The latter methods are based on the silver fluoride-catalyzed reaction of carbon monoxide with fluorine at about 180° C. These methods involve not only the known hazards of operating with elemental fluorine but also require precise control of the stoichiometric balance of the reactants to achieve the best yields of bis(trifluoromethyl) peroxide in one step.

The present invention provides an improved process for the preparation of bis(trifluoromethyl) peroxide which involves reaction of carbonyl fluoride and chlorine trifluoride at 0–300° C.

A preferred form of this invention involves the reaction of carbonyl fluoride and chlorine trifluoride in the presence of alkali metal fluorides or bifluorides at 100–250° C. In this preferred form, the process is insensitive to wide variations in the proportions of carbonyl fluoride and chlorine trifluoride because bis(trifluoromethyl) peroxide is substantially the sole fluorocarbon product. Therefore, the proportions of the reactants may be varied over a wide range. However, it is preferable to use the reactants in essentially the range of proportions indicated by the following equations:

$$2COF_2 + ClF_3 \rightarrow CF_3OOCF_3 + ClF$$
$$6COF_2 + 2ClF_3 \rightarrow 3CF_3OOCF_3 + Cl_2$$

The reaction is carried out between 0 and 300° C., preferably between 100 and 250° C. At temperatures below 100° C. the reaction proceeds slowly, and at temperatures above 250° C. the formation of tetrafluoromethane as a byproduct begins to interfere and reaches the point where it becomes predominant at about 300° C. and above.

The process is conveniently carried out in a closed vessel under the autogenous pressures of the reactants. However, the actual pressure involved in the process can be varied widely since the rate of reaction is substantially independent of pressure. For example, the process can be carried out in a continuous flow system at atmospheric pressure.

The process is benefited by the presence of the fluoride or bifluoride salts of the alkali and alkaline earth metals, particularly in the lower and upper regions of the operability temperature range, i.e., at 0–100° C. and at 250–300° C. This benefit is two-fold and is derived from a catalytic effect on the formation of bis(trifluoromethyl) peroxide at the lower temperatures and a suppressive effect on the formation of tetrafluoromethane at the higher temperatures. The fluorides and bifluorides that operate with these beneficial results are lithium fluoride, sodium fluoride, sodium bifluoride, potassium fluoride, potassium bifluoride, cesium fluoride, beryllium fluoride, calcium fluoride, strontium fluoride and barium fluoride. The amount of alkali metal or alkaline earth metal fluoride or bifluoride that will produce these benefits can vary over a wide range from about .01 to 2.0 moles per mole of chlorine trifluoride.

The reaction vessel in which carbonyl fluoride and chlorine trifluoride are brought into contact should be constructed of material which is resistant to attack by the reactants or by hydrogen fluoride. Metals which may be employed for this purpose include nickel, copper, Monel and nickel-iron-molybdenum alloy. The mixture of products obtained in the reaction may be stored at room temperature in pressure vessels constructed of any of the above-enumerated metals, and the storage vessels may also be constructed of types 304 or 347 stainless steel.

Isolation and purification of bis(trifluoromethyl) peroxide obtained by the process of this invention is accomplished by well-recognized procedures. Since chlorine trifluoride and chlorine monofluoride may be present in the reaction mixture, these highly reactive and potentially hazardous components are preferably first deactivated by reaction with anhydrous calcium chloride. The deactivated gaseous mixture is scrubbed with water and dilute caustic to remove chlorine and residual carbonyl fluoride, and it is finally dried to complete the purification. The bis(trifluoromethyl) peroxide obtained is essentially pure if the preferred process of this invention is employed. However, if the conditions are such that tetrafluoromethane is obtained as a by-product, ordinary fractional distillation of the mixture is sufficient to remove this impurity.

The invention is illustrated in greater detail in the following examples.

Example I

A pressure vessel of 80 ml. capacity, constructed of a corrosion-resistant nickel-iron-molybdenum alloy, was evacuated and cooled to −80° C. There was then added by gaseous transfer 9 g. (0.097 g. mole) of chlorine trifluoride and 8.7 g. (0.13 g. mole) of carbonyl fluoride. The reaction vessel was closed and heated to 200° C. for 6 hours, an autogenous pressure of 475–485 p.s.i. being developed. After cooling to room temperature, the volatile products were transferred directly into an evacuated stainless steel cylinder cooled in liquid nitrogen. The product thus obtained weighed 17.2 g. A sample of the gaseous product was passed through an absorption tube containing granulated charcoal to remove unchanged chlorine trifluoride, and subsequent analysis by gas chromatography indicated that the mixture contained 27.4% carbonyl fluoride and 72.6% trifluoromethyl peroxide. The chromatographic column was standardized with authentic bis(trifluoromethyl) peroxide prepared by the method of Porter and Cady (loc. cit.).

*Example II*

A 240-ml. pressure vessel constructed of a corrosion-resistant nickel-iron-molybdenum alloy and charged with 11.25 g. (0.19 g. mole) of anhydrous potassium fluoride and 2.0 g. (0.014 g. mole) of silver difluoride was evacuated, cooled to −80° C., and loaded with 45 g. (0.49 g. mole) of chlorine trifluoride and 47 g. (0.71 g. mole) of carbonyl fluoride as in Example I. The mixture was heated to 200° C. for 10 hours, and an autogenous pressure of 1215–1325 p.s.i. was developed. The volatile product, which had been transferred directly into a stainless steel cylinder, weighed 55 g. A sample of the product was passed through granulated charcoal and then analyzed by gas chromatography, which indicated that the mixture contained 5.6% carbonyl fluoride and 94.4% bis(trifluoromethyl) peroxide. Bis(trifluoromethyl) peroxide was isolated from the crude reaction mixture by passing it through a purification train comprised of the following:

(1) An absorption tube containing granulated anhydrous calcium chloride for removal of unreacted $ClF_3$ and by-product $ClF$;

(2) A gas washing bottle containing water for hydrolysis of carbonyl fluoride;

(3) A gas washing bottle containing 5% sodium hydroxide for removal of hydrogen fluoride, carbon dioxide, chlorine and residual carbonyl fluoride;

(4) A trap cooled to −80° C. to freeze out water and to condense bis(trifluoromethyl) peroxide; and (5) A liquid nitrogen-cooled trap to prevent possible loss of bis(trifluoromethyl) peroxide (B.P. −37° C.).

The bis(trifluoromethyl) peroxide which condensed in the trap at −80° C. was transferred into the liquid nitrogen-cooled trap under reduced pressure, and the product was then finally transferred to a stainless steel storage vessel. Gas chromatographic analysis indicated that the purified product contained only a trace of carbon dioxide, and its infrared spectrum was identical with that reported for bis(trifluoromethyl) peroxide by Porter (dissertation, "Some Chemical Properties of Trifluoromethyl Hypofluorite," University of Washington, 1956).

*Example III*

A pressure vessel constructed of a nickel-iron-molybdenum alloy was evacuated, cooled to −80° C., and loaded with 22.2 g. (0.34 g. mole) of carbonyl fluoride and 25.0 g. (0.27 g. mole) of chlorine trifluoride as in Example I. The mixture was heated to 250° C. for 5 hours and was then cooled to room temperature. The volatile product which was transferred directly to a Monel storage vessel, weighed 46.9 g. Analysis of the product after treatment with granulated charcoal indicated the following: $CF_4=9\%$; $COF_2=8\%$; $CF_3OOCF_3=83\%$.

*Example IV*

A nickel-iron-molybdenum alloy pressure vessel was evacuated, cooled to −80° C. and loaded with 25.6 g. (0.39 g. mole) of carbonyl fluoride and 25 g. (0.27 g. mole) of chlorine trifluoride as in Example I. The mixture was heated to 300° C. for 1 hour and was then cooled to room temperature. The volatile product, which was transferred directly to a Monel storage vessel, weighed 50.4 g. After treatment with granulated charcoal, the product analyzed as follows: $CF_4=91\%$; $COF_2=3\%$; $CF_3OOCF_3=6\%$.

*Example V*

A nickel-iron-molybdenum alloy pressure vessel containing 25 g. (0.43 g. mole) of anhydrous potassium fluoride and 60 g. (0.91 g. mole) of chlorine trifluoride was heated at 150° C. for 3 hours under autogenous pressure. The reactor was cooled to room temperature, and 48 g. of volatile products (largely or entirely unreacted chlorine trifluoride) were bled off into an evacuated stainless steel cylinder. Without exposing the residual $KClF_4$ (calculated 19.5 g. or 0.13 g. mole) to air or moisture, 8 g. (0.12 g. mole) of carbonyl fluoride was condensed into the reactor after cooling the reactor to −80° C. The reaction mixture was then heated at 175° C. for 12 hours under autogenous pressure. After cooling the reaction vessel to room temperature, the volatile products were transferred to an evacuated stainless steel cylinder. The crude product thus obtained weighed 13 g. and was found by gas chromatographic analysis to contain 88.8% bis(trifluoromethyl) peroxide.

*Example VI*

A nickel-iron-molybdenum alloy pressure vessel containing 2.0 g. (0.026 g. mole) of potassium bifluoride was evacuated, cooled to −80° C. and loaded with 27.3 g. (0.41 g. mole) of carbonyl fluoride and 25 g. (0.27 g. mole) of chlorine trifluoride. The mixture was heated to 250° C. for 5 hours and was then cooled to room temperature. The volatile product, which had been transferred directly to a Monel storage cylinder, weighed 46.2 g. The product had the following analysis: $CF_4=1.5\%$; $COF_2=6.2\%$; $CF_3OOCF_3=92.3\%$.

*Example VII*

A nickel-iron-molybdenum alloy pressure vessel containing 2.0 g. (0.013 g. mole) of cesium fluoride was evacuated, cooled to −80° C. and loaded with 23.5 g. (0.36 g. mole) of carbonyl fluoride and 25 g. (0.27 g. mole) of chlorine trifluoride. The mixture was heated to 250° C. for 5 hours and was then cooled to room temperature. The volatile product, which was stored in a Monel vessel, weighed 47.1 g. The product analyzed as follows: $CF_4=$trace; $COF_2=12\%$; $CF_3OOCF_3=88\%$.

As stated before, bis(trifluoromethyl) peroxide is useful as an initiator for the polymerization and copolymerization of ethylenically unsaturated monomers. Its useful temperature range is about 100° C. to about 250° C., and it is particularly useful in the polymerization and copolymerization of fluoroolefin monomers, since it does not introduce reactive end groups which can detract from the inherently excellent stability associated with fluorocarbon polymers.

The process of this invention possesses several advantages over previous methods of preparing bis(trifluoromethyl) peroxide. These advantages include the ability to produce higher yields of the peroxide, the minimization of by-products, and better operability in terms of flexibility and safety. The process of Porter and Cady (loc. cit.), for example, which is based on the reaction of carbon monoxide with elemental fluorine, requires a precise control of the proportions of the reactants to avoid producing excessive amounts of by-products at the expense of bis(trifluoromethyl) peroxide, and it also involves the handling of elemental fluorine which is known to be extremely hazardous.

Since obvious modifications and equivalents in the invention will be apparent to those skilled in the chemical arts, we propose to be bound solely by the appended claims.

The embodiments of the invention in which an exclusive property or privilege is claimed are defined as follows:

1. The process of preparing bis(trifluoromethyl) peroxide which comprises contacting carbonyl fluoride and chlorine trifluoride at a temperature of about 0–300° C.

2. The process of claim 1 wherein the temperature is in the 100–250° C. range.

3. The process of claim 1 wherein the initial mole ratio of carbonyl fluoride to chlorine trifluoride is between about 2:1 and 3:1.

4. The process of claim 1 accomplished in the presence of a member of the group consisting of lithium fluoride, sodium fluoride, sodium bifluoride, potassium fluoride, potassium bifluoride, cesium fluoride, beryllium fluoride, calcium fluoride, strontium fluoride and barium fluoride.

References Cited by the Examiner

UNITED STATES PATENTS 2,702,306  2/55  Gall et al.

FOREIGN PATENTS 676,374  7/52  Great Britain.

OTHER REFERENCES

Handbook of Chemistry & Physics, 41st Ed. (1959–1960), pages 448–449, pub. by Chemical Rubber Pub. Co., Cleveland, Ohio.

Porter et al., Jour. Amer. Chem. Soc., 79:5628–31 (Nov. 5, 1957), 2 pages.

LEON ZITVER, *Primary Examiner.*

CHARLES B. PARKER, *Examiner.*